US006801685B2

United States Patent
Goodman et al.

(10) Patent No.: US 6,801,685 B2
(45) Date of Patent: Oct. 5, 2004

(54) TRAPPING LIGHT PULSES AT CONTROLLED PERTURBATIONS IN PERIODIC OPTICAL STRUCTURES

(75) Inventors: Roy Howard Goodman, Hoboken, NJ (US); Richart Elliott Slusher, Lebanon, NJ (US); Michael Ira Weinstein, Short Hills, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 118 days.

(21) Appl. No.: 10/174,637

(22) Filed: Jun. 19, 2002

(65) Prior Publication Data

US 2003/0235364 A1 Dec. 25, 2003

(51) Int. Cl.[7] .................................................. G02B 6/34
(52) U.S. Cl. ............................ 385/27; 385/28; 385/31; 385/37
(58) Field of Search ............................ 385/27, 28, 31, 385/37

(56) References Cited

U.S. PATENT DOCUMENTS 5,946,117 A * 8/1999 Meli et al. ................... 398/80

OTHER PUBLICATIONS

Slusher et al, "Nonlinear Optical Pulse Propagation Experiments in Photonic Bandgap Materials", Aug. 1998, Nonlinear Optics '98: Materials, Fundamentals and Applications Topical Meeting, pp. 245–247.*

De Sario et al, "Optically Controlled Delay Lines by Pulse Self–Trapping in Parametric Waveguides with Distributed Feedback", Aug. 2000, IEEE Journal of Quantum Electronics, vol. 36, No. 8, pp. 931–943.*

W. Chen et al., *Gap Solitons* . . . , Phys. Rev. Lett., vol. 58, No. 2, pp. 160–163 (Jan. 1987).

D. N. Christodoulides et al., *Slow Bragg Solitons* . . . , Phys. Rev. Lett., vol. 62, No. 15, pp. 1746–1749 (Apr. 1989).

A. B. Aceves et al., *Self–induced Transparency* . . . , Phys. Lett. A, vol. 141, No. 1,2, pp. 37–42 (Oct. 1989).

B.J. Eggleton et al., *Nonlinear pulse* . . . , J. Opt. Soc. Am. B, vol. 14, No. 11, pp. 2980–2992 (1997).

N. G. R. Broderick et al., *Approximate Method* . . . , Phys. Rev. E, vol. 58, No. 6, pp. 7941–7950 (Dec. 1998).

* cited by examiner

*Primary Examiner*—John D. Lee
*Assistant Examiner*—Sung Pak

(57) ABSTRACT

A gap soliton can be controlled by introducing a perturbation into a waveguide structure that includes an otherwise essentially periodic variation of its refractive index. In one embodiment of our invention, by controlling the amplitude, phase and/or average value of the refractive index of a first perturbation, and by maintaining the speed of the soliton below a certain critical speed, we have found that the soliton will transfer its energy to the modes of the perturbation. When the soliton transfers essentially all of its energy in this way, we refer to the soliton as being trapped or captured by the perturbation. Trapped gap solitons enable a variety of unique system applications in, for example, memories, buffers, switches and WDM demultiplexers.

12 Claims, 6 Drawing Sheets

TRAPPING LIGHT PULSES AT CONTROLLED PERTURBATIONS IN PERIODIC OPTICAL STRUCTURES

GOVERNMENT CONTRACT

This invention was made with Government support under NSF University-Industry Cooperative Research Fellowship No. DMS-99-01897. The Government has certain rights in this invention.

BACKGROUND OF THE INVENTION

1. Field of the Invention

This invention relates to optical apparatus (e.g., devices, systems) that trap light pulses at predetermined locations, and, more particularly, to optical memories, buffers and switches that trap gap solitons at controlled perturbations in periodic optical structures.

2. Discussion of the Related Art

Optical solitons are important carriers of optical energy in many physical systems. The emergence of solitons is understood to be a consequence of the balance of dispersive and nonlinear effects on the same length scale. More specifically, it is well known that dispersion causes optical (light) pulses to spread out as they propagate in a dispersive medium (e.g., a silica fiber) due to the fact that the refractive index of the medium is wavelength dependent; thus, different wavelength components of the pulse travel at different speeds. On the other hand, the electric-field-dependent nonlinearity of the refractive index of the same medium may compensate for this pulse spreading at sufficiently high intensity of the propagating pulse. When this compensation or balancing is controlled properly, the pulse will retain its original shape, without spreading, over extended propagation distances. This type of pulse is referred to as a temporal soliton.

Optical temporal solitons have been considered candidates for the data bits by which to information is transferred over long distances. In contrast, recent advances in the fabrication of optical fiber with microstructure have rendered the possibility of storing information in the form of optical gap solitons, which are nonlinear bound states that propagate in periodic structures. Their frequencies lie in the band gap of the linear (Floquet-Bloch) frequency spectrum. They have been anticipated in theoretical work [See, for example, W. Chen et al., *Phys. Rev. Lett.*, Vol. 58, p. 160 (1987), which is incorporated herein by reference.] and observed in experimental work [See, for example, B. J. Eggleton et al., *J. Opt. Soc. Am. B*. Vol. 14, No. 11, p. 2980 (1997), which is also incorporated herein by reference.] on sufficiently high intensity light propagation in optical fiber with a periodically varying refractive index (specifically, a uniform fiber grating). In contrast to optical fiber used in long distance communication systems, where the formation length for temporal solitons is on the order of kilometers, the formation length for gap solitons is on the order of only centimeters.

BRIEF SUMMARY OF THE INVENTION

We have discovered that a gap soliton can be controlled by introducing a perturbation in an optical structure (e.g., a waveguide) that includes an otherwise essentially periodic variation of its refractive index. In one embodiment of our invention, by controlling the amplitude, phase and/or average (e.g., background) value of the refractive index of a first perturbation, and by maintaining the speed of the soliton below a certain critical speed, we have found that the soliton will transfer its energy to the modes of the perturbation. When the soliton transfers essentially all of its energy in this way, we refer to the soliton as being trapped or captured by the perturbation. Surprisingly, the soliton can be trapped without loss of a significant amount of its energy. In an alternative embodiment, when the speed of the soliton exceeds the critical speed, a second perturbation is introduced into the waveguide structure to reduce the speed of the soliton, thereby enabling its capture by the first perturbation. In another embodiment, a gap soliton is captured between two perturbation regions neither of which is capable of capturing the soliton by itself.

Our approach to trapping gap solitons enables a variety of unique applications in, for example, memories, buffers, switches and WDM demultiplexers.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

DETAILED DESCRIPTION OF THE INVENTION

Periodic Trapping Structure

Figure 1A:
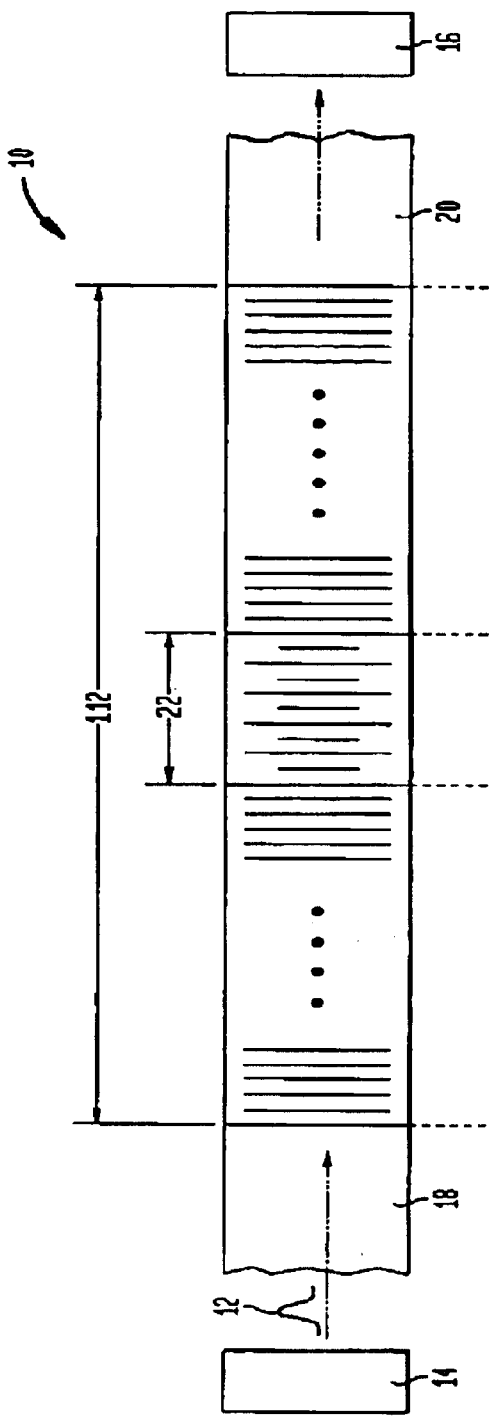
FIG. 1A is a schematic view of an essentially periodic optical structure for trapping gap solitons in accordance with one embodiment of our invention.

With reference now to FIG. 1, we show in FIG. 1A an essentially periodic optical structure 10 (e.g., a planar waveguide or an optical fiber) that supports the propagation of gap solitons 12 generated by a soliton source 14. The solitons propagate through the structure and under controlled conditions may reach utilization device 16. The latter may be an optical detector, an optical amplifier or other suitable piece of terminal equipment.

Figure 1B:
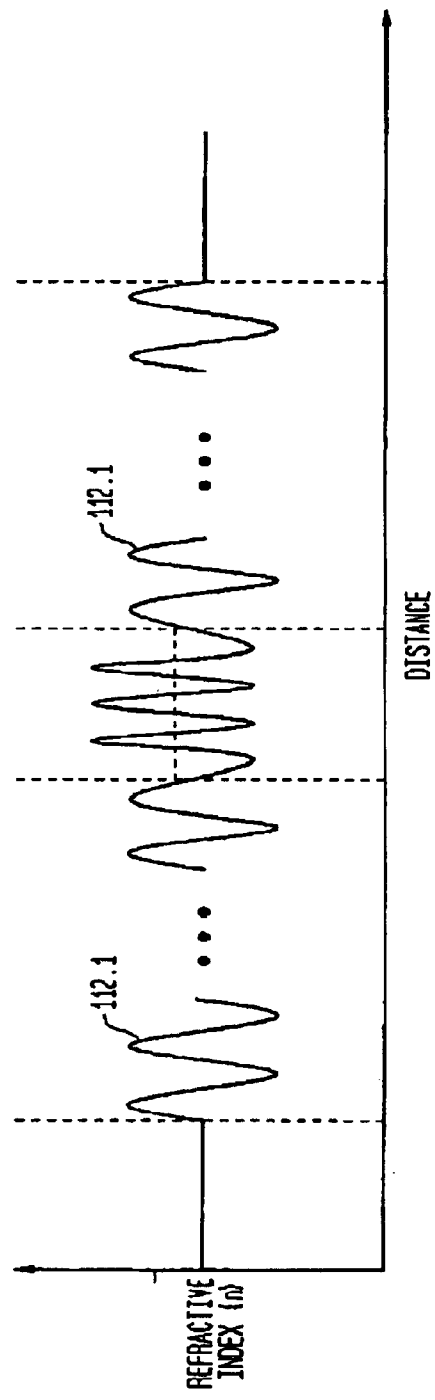
FIG. 1B is a schematic representation of the refractive index variations of the structure of FIG. 1A.

The structure 10 is essentially periodic in that its refractive index (hereinafter referred to as simply index) varies essentially periodically in the direction of soliton propagation. FIG. 1B is a schematic representation of how the index might illustratively vary in the structure. In particular, structure 10 includes input and output regions 18 and 20, respectively, in which the index may be more or less constant as shown, or it may be essentially periodic (not shown). Between the input and output regions is disposed a first region 112 in which the index varies essentially periodically, as illustrated schematically by the sinusoidal-like curves 112.1 of FIG. 1B. However, curves 112.1 need not be precise sinusoids. The variation in refractive index could approximate any of a myriad of mathematical functions, such as a square wave, for example. In addition, the variations need not be uniform; they could be chirped, for example. In one embodiment the first region 112 constitutes a Bragg diffraction grating.

In accordance with one aspect of our invention, the first region 112 includes perturbation region 22, which for purposes of illustration is shown to be centrally located within the first region, but which, of course, may be disposed at any point within the first region. Perturbation region 22 is designed to induce an effective potential well having at least one bound state (e.g., at least a ground state and preferably one or more higher energy states). These states are referred to herein as linear perturbation modes for sufficiently low field intensities and as nonlinear perturbation modes for sufficiently high field intensities. Preferably, the spatial width of the potential well is of the order of the spatial width of the soliton. For gap solitons of a particular propagation velocity and intensity, the amplitude, phase and/or average value of the index within the perturbation region are mutually adapted so that the gap soliton transfers its energy to the bound state(s). Under these circumstances the gap soliton is effectively trapped or captured by the perturbation region. The soliton remains trapped for time periods that are long relative to the temporal width of the soliton (e.g., $10^4$ times that width) and hence useful in the various applications (e.g., buffers, memories) discussed hereinafter. After that time expires, the energy of the trapped soliton may have dissipated (e.g., radiated). However, prior to significant dissipation the trapped soliton may be forced out of the perturbation mode back into a propagation mode in the adjacent periodic structure, where, for example, it might propagate to utilization device 16.

Figure 6:
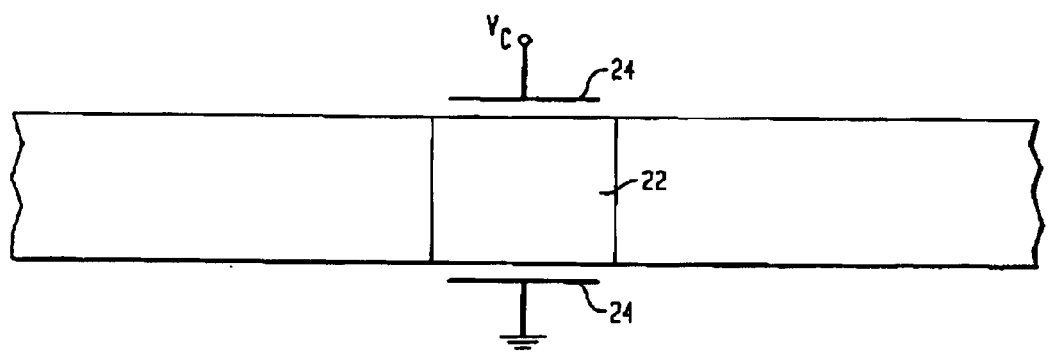
FIG. 6 is a schematic of an essentially periodic optical structure showing the use of an electric field to release a trapped gap soliton in accordance with still another embodiment of our invention, but the grating lines have been omitted for simplicity.
Figure 7:
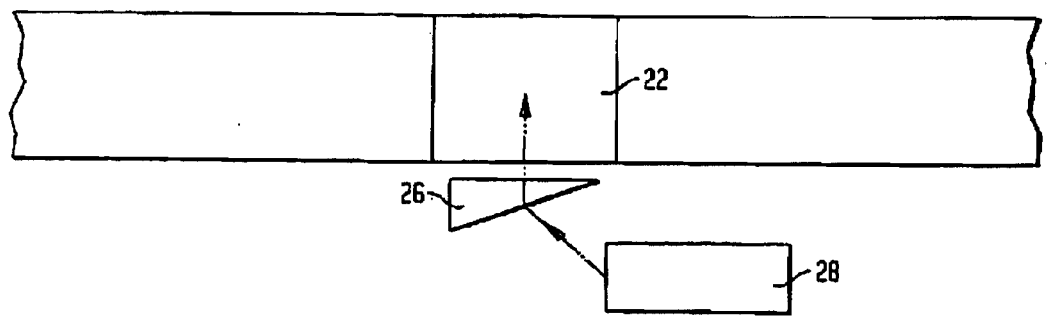
FIG. 7 is a schematic of an essentially periodic optical structure showing the use of an optical field to release a trapped gap soliton in accordance with yet another embodiment of our invention, but the grating lines have been omitted for simplicity.

One way to cause a trapped soliton to escape is to alter temporarily the index parameters within the perturbation region 22. For example, optical, electrical or mechanical (e.g., acoustic) means may be used to alter the index parameters, which in turn alters the Bragg resonance or grating period. Thus, an electrical pulse may be applied to the perturbation region 22 via electrodes 24, as illustrated in FIG. 6, or an optical pulse may be applied to, and absorbed by, the perturbation region 22 via pulse generator 28 and optical coupler 26, as illustrated in FIG. 7.

Figure 2A:
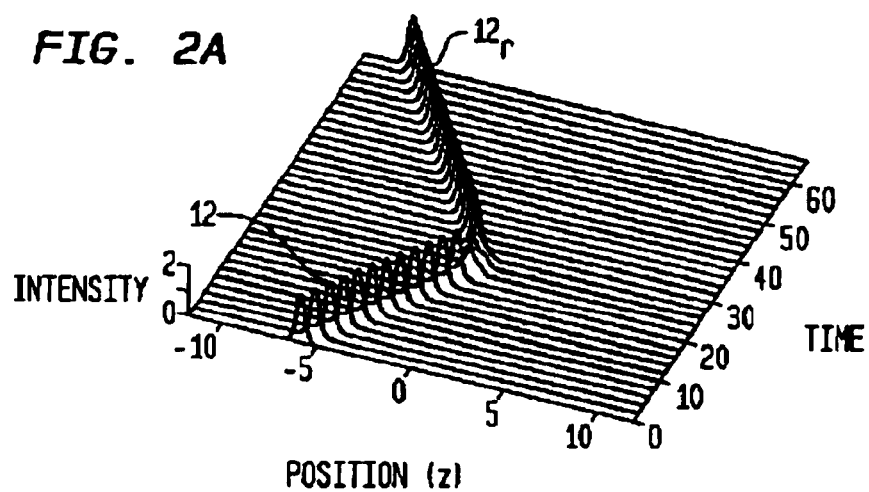
FIG. 2 shows computer simulations of the evolution of gap solitons that are reflected (FIG. 2A), transmitted (FIG. 2B) and partially trapped (FIG. 2C) by perturbation regions of the type shown in FIG. 1A.
Figure 2B:
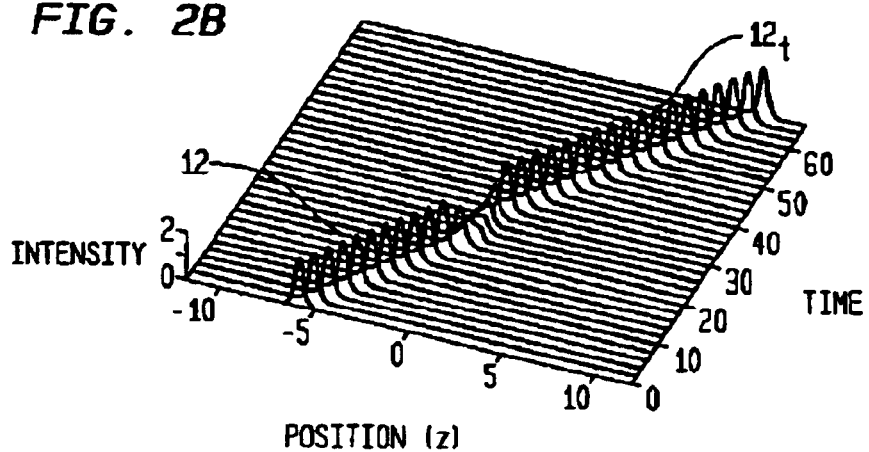
Figure 2C:
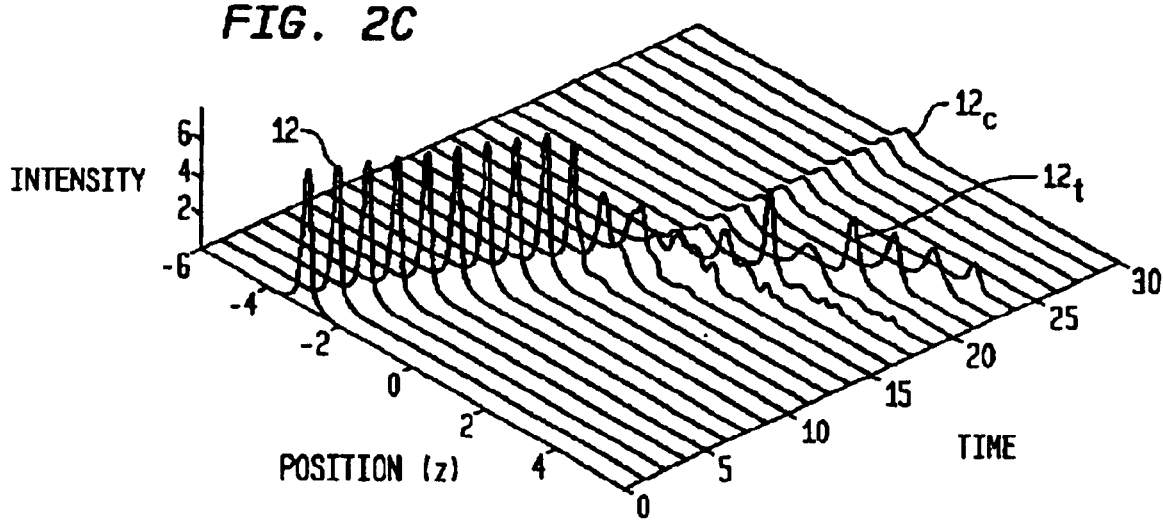

FIG. 2 illustrates computer simulations showing the propagation of a gap soliton 12 in an essentially periodic structure of the type shown in FIG. 1, with the perturbation region being located graphically at position z=0 in FIG. 2. Depending on the various design parameters discussed above, the gap soliton 12 is either (1) fully reflected by the perturbation region, as depicted by soliton $12_r$ (FIG. 2A; the soliton 12 starts at t=0 at position z=−5, and reaches the perturbation region at z=0 at about t=25; thereafter the soliton $12_r$ is reflected back to z=−10), (2) fully transmitted, as depicted by soliton $12_t$ (FIG. 2B; the soliton 12 again starts at t=0 at position z=−5, and reaches the perturbation region at z=0 at about t=25; thereafter the soliton $12_t$ is transmitted on to z=+10), or (3) trapped/captured, as depicted by soliton $12_c$ (FIG. 2C; the soliton 12 starts at t=0 at position z=−3, and reaches the perturbation region at z=0 at about t=15; thereafter the lower intensity soliton $12_t$ remains trapped at the position z=0 until at least t=30, whereas the soliton $12_t$ is transmitted). FIG. 2C demonstrates that a gap soliton may be partially reflected and partially transmitted and, hence, partially trapped. (Utilizing differently designed perturbation regions, we have demonstrated (infra in conjunction with FIG. 10) that it is possible to capture essentially all of the energy of a gap soliton.

Figure 5:
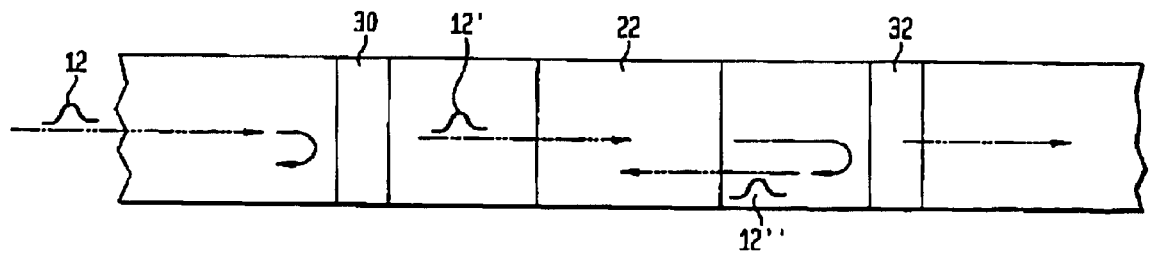
FIG. 5 is a schematic of an alternative an essentially periodic optical structure in which multiple perturbations are used to capture a gap soliton in accordance with another embodiment of our invention, but the grating lines have been omitted for simplicity.

These interactions between gap solitons and nonlinear perturbation regions may be exploited in a number of useful ways as depicted in FIG. 5. For example, if the velocity of the gap soliton 12 is too high to allow it to be captured by perturbation region 22, then it may first be slowed down by a second perturbation region 30 located upstream of the region 22. Region 30 itself does not capture the soliton, rather it merely dissipates some of the soliton's energy (e.g., by partially reflecting and partially transmitting the soliton) so that the transmitted soliton 12' is captured by perturbation region 22. Alternatively, region 30 may be omitted and instead a third perturbation region 32 may be positioned downstream of the perturbation region 22. In this case, the gap soliton 12 is initially not captured by region 22, rather it is transmitted therethrough and made incident upon region 32. The latter redistributes some of the energy of soliton 12'; i.e., it is partially transmitted and partially reflected. The reflected portion 12" is then captured by perturbation region 22.

Alternatively, consider an embodiment of FIG. 5 in which the perturbation region 22 is omitted (and replaced by a conventional, essentially periodic structure) and neither of the perturbation regions 30 and 32 is capable of capturing a gap soliton. Instead, the gap soliton is captured between the regions 30 and 32; i.e., the soliton 12 propagates through the region 30, is partially reflected (and partially transmitted) by region 32, so that the lower intensity reflected soliton 12" is no longer transmitted by the region 30. Consequently, the soliton bounces back and forth between regions 30 and 32; i.e., it is effectively trapped.

Applications of Trapped Solitons

Figure 8:
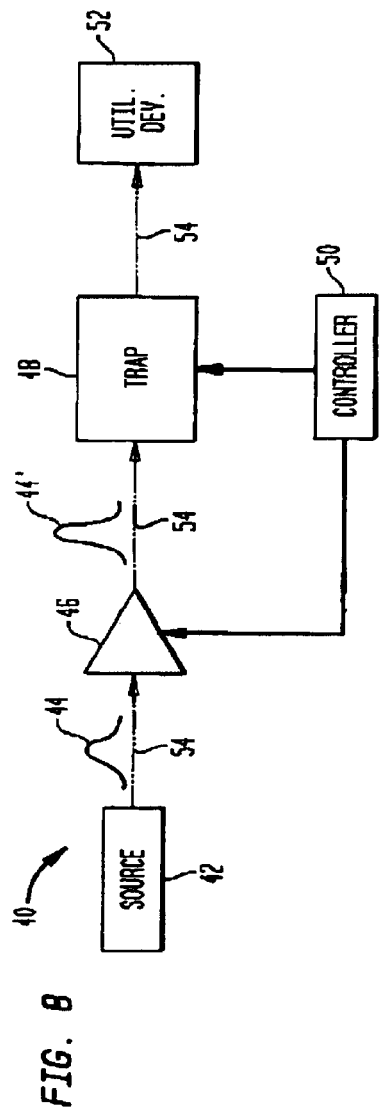
FIG. 8 is a schematic block diagram of a buffer or memory in accordance with one more embodiment of our invention.

The trapping of gap solitons finds application in numerous types of apparatus, such as the buffer, memory or switch (e.g., of the on-off type) depicted schematically in FIG. 8. Here, a source 42 generates a gap soliton 44 that propagates along an optical path that includes an essentially periodic optical structure 54 (depicted schematically by the dot-dashed lines), an optical amplifier 46, a soliton trap 48 (e.g., a device having a perturbation region designed to trap a gap soliton) and a utilization device 52. The amplifier and the trap are under the control of controller 50.

In operation, the source 42 generates a gap soliton 44 that passes through amplifier 46 either unamplified or amplified depending on a control signal supplied to the amplifier by controller 50. For example, the presence of a control signal may turn on the amplifier so that it amplifies soliton 44 applied to its input to produce amplified soliton 44' at its output. When amplified soliton reaches trap 48, being of sufficient intensity, it is captured therein, but when unamplified soliton 44 reaches trap 48, being of insufficient intensity, it is not captured. Rather, unamplified soliton 44 is either reflected or transmitted depending on the design of the trap and the velocity/intensity of the gap soliton.

The sufficiency of the soliton intensity is related to the desired amount of shift of the photonic band gap, as described in the next section.

The trapped soliton, on the other hand, remains trapped for an extended period of time relative to the temporal width of the solitons generated by source 42. Well before the trapped soliton dissipates, however, a control signal from controller 50 is applied to the trap 48 to allow the trapped soliton to escape and to propagate to utilization device 52.

Of course, FIG. 8 depicts a system that incorporates only a single trap, whereas in practice the system might include a multiplicity or array of such traps each capable of capturing a different soliton generated by source 42 (or by a multiplicity of such sources) propagating on a multiplicity of different optical paths.

Figure 9:
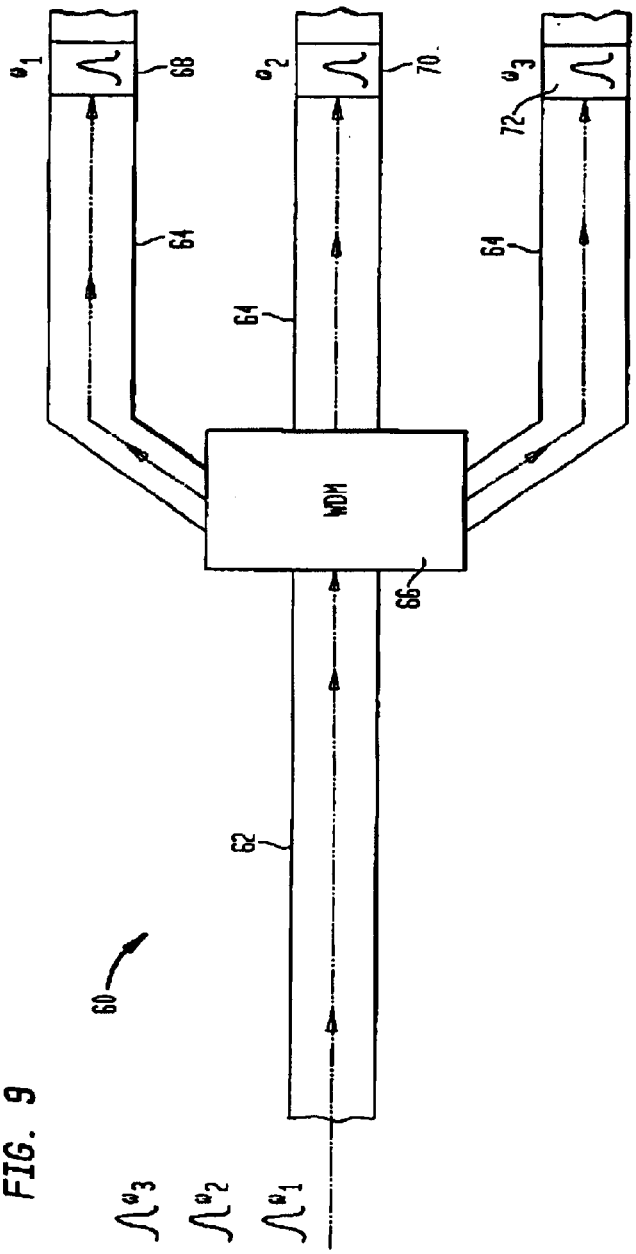
FIG. 9 is a schematic block diagram of a frequency demultiplexer in accordance with another embodiment of our invention, but the grating lines have been omitted for simplicity.

Another application of our invention is the demultiplexer 60 of FIG. 9. Here, a soliton source (not shown) generates a multiplicity of solitons each at a different optical frequency $\omega_1$, $\omega_2$, $\omega_3$ and inputs them onto an essentially periodic optical structure 62. Three such solitons are shown for simplicity, but more or fewer soliton frequencies may be employed as a matter of design choice. The structure 62 is optically coupled to three branch-like, essentially periodic optical structures 64 by means of a WDM coupler 66. Each branch includes a trap 68, 70, or 72, with each trap being designed to trap a soliton of only one of the system frequencies. Controllers to release the trapped solitons have been omitted for simplicity.

In order to understand the trapping phenomena quantitatively, we first describe the nature of gap solitons and then provide mathematical relationships that are useful in designing essentially periodic optical structures in accordance with our invention.

Gap Solitons

In an essentially periodic optical structure, such as a Bragg grating, the transmission characteristic 40 (FIG. 3) has a stop band 42. A uniform Bragg grating of period $d=\pi/k_B$ is specified by a periodically varying refractive index profile given by:

$$n = n_b + \Delta n[W/2 + \upsilon \cos(2k_B z + 2\phi)], \quad (1)$$

where $n_b$, $\Delta n$, $W$, $\upsilon$ and $\phi$ are constants defined as follows: $n_b$ is the background refractive index (e.g., the z-independent index of an optical waveguide that has no grating), $\Delta n$ is the refractive index contrast, $W$ corresponds to the average refractive index, $\upsilon$ is corresponds to the amplitude of the index variations, and $\phi$ is a phase shift parameter. W and $\upsilon$ are parameters that, along with $\phi$, will be slowly modulated in the discussion that follows. The stop band 42 over a range of frequencies $\omega_B \pm \Delta\omega$ centered at the Bragg frequency $\omega_B$ has a width $2\kappa$ given by:

$$2\tilde{\kappa} \approx 2\pi\upsilon\Delta n/\lambda_B \quad (2)$$

where $$\lambda_B = 2n_b d \quad (3)$$

and where $\omega$ is the angular frequency of the gap soliton corresponding to the detuning from the Bragg resonant frequency $\omega_B$. Thus, $\omega=0$ means that the soliton frequency is at the Bragg resonance, whereas $\omega>0$ and $\omega<0$ mean, respectively, that the soliton frequency is toward the higher and lower ends of the photonic band gap. This stop band, which is referred to as the photonic band gap, is a function of the refractive index contrast of the grating and its period in the linear regime; i.e., at low optical intensities. In essentially periodic structures of this type the dispersion is much higher (e.g., by six orders of magnitude) than in optical structures in which the index is essentially uniform. Under these circumstances, a low-intensity soliton, depicted by its spectrum 13 centered at $\omega_{12}$, would not be transmitted (i.e., it would be reflected by the grating).

At higher optical intensities, however, another phenomenon comes into play; that is, a nonlinear component of the refractive index that is proportional to the square of the optical field. When the contribution of this nonlinear component is comparable to the index contrast, then the optical intensity determines the optical frequency of a soliton in the following sense. At relatively high optical intensities the transmission characteristic 40 shifts to higher frequencies, as shown by the shifted characteristic 40'. In this case, the higher-intensity soliton, depicted by its spectrum 15, centered at the same optical frequency $\omega_{12}$, which lies in the gap between ($\omega_B - \Delta\omega$) and $\omega_B$, is transmitted by the grating. This type of soliton is referred to as a gap soliton.

Perturbation Modes

Gap solitons are the fundamental nonlinear bound states of propagation in a uniform periodic optical structure. We consider perturbations to an essentially periodic structure that are modeled by z-dependent modulations of the parameters W, $\upsilon$ and $\phi$ in equation (1). Thus, we take $W=W(z)$, $\upsilon=\upsilon(z)$ and $\phi=\phi(z)$.

If we let $e_+$ and $e_-$ denote the forward and backward electric field envelopes, then the full electric field has the following approximate form:

$$E = e_+(z,t)\exp[i(k_B z + \phi - \omega_B t)] + e_-(z,t)\exp[-i(k_B z + \phi + \omega_B t)] \quad (4)$$

The equations governing the evolution of $e_+$ and $e_-$ are as follows:

$$i(n_b/c)\partial_t e_+ + i\partial_z e_+ + \kappa(z)e_- + \tilde{V}(z)e_+ = 0$$

$$i(n_b/c)\partial_t e_- - i\partial_z e_- + \kappa(z)e_+ + \tilde{V}(z)e_- = 0 \quad (5)$$

where $\omega_B = ck_B/n_b$. The functions $\kappa(z)$ and $\tilde{V}(z)$ are defined by:

$$\kappa(z) = (\pi\Delta n/\lambda_B)\upsilon(z)$$

$$\tilde{V}(z) = (\pi\Delta n/\lambda_B)W(z) - \phi'(z) \quad (6)$$

Next, we introduce nondimensional variables as follows: Z is a nondimensional distance, T is a nondimensional time, $E_+$ and $E_-$ are, respectively, nondimensional forward and backward electric field envelopes, $\kappa(Z)$ is a nondimensional form of $\kappa(z)$, and $V(Z)$ is a nondimensional form of $\tilde{V}(z)$. In these nondimensional variables, the dynamics of the slowly varying envelope of the electric field are given by a system of two partial differential equations, which may be combined and rewritten as follows:

$$[i\partial_T + i\sigma_3\partial_Z + V(Z) + \kappa(Z)\sigma_1]E = 0 \quad (7)$$

In equation (7) $\partial_z$ and $\partial_T$ denote partial derivatives with respect to Z and T, respectively; $\sigma_3$ and $\sigma_1$ denote the standard 2×2 Pauli matricies given explicitly by:

$$\sigma_3 = \begin{pmatrix} 1 & 0 \\ 0 & -1 \end{pmatrix} \quad (8)$$

$$\sigma_1 = \begin{pmatrix} 0 & 1 \\ 1 & 0 \end{pmatrix} \quad (9)$$

E is a 2-component column vector with the one component ($E_-$) denoting the slowly varying envelope of the backward traveling electric field and the other component ($E_+$) denoting the slowly varying envelope of the forward traveling electric field. We seek solutions of the form:

$$E(Z) = \exp[-i\omega T]\exp[i\sigma_3 \int V(\zeta)d\zeta]F(Z), \quad (10)$$

where the integral in equation (5) is taken over the range 0 to Z, $\zeta$ is a dummy variable. F(Z) satisfies equation (11) below:

$$(\omega + i\sigma_3\partial_z + \sigma_1\kappa(Z) + V(Z))F(Z) = 0, \quad (11)$$

Solutions, F(Z), that are square integrable in Z are called perturbation modes. (They are also called defect modes, but we prefer not to use that term herein since it connotes a sense that the perturbation occurs somehow randomly, whereas, in accordance with our invention, perturbations are introduced controllably.) On the other hand solutions that are bounded and oscillatory in Z are called radiation modes. The set of frequencies, ω, corresponding to the perturbation modes and radiation modes is called the spectrum.

When these linear perturbation modes include nonlinear terms, they deform into nonlinear perturbation modes. The latter have nonlinear bound states of the form:

$$E(Z,T) = \exp[i\omega T]\epsilon(Z) \quad (12)$$

where $\epsilon$ and ω satisfy the nonlinear eigenvalue equation:

$$(\omega + i\sigma_3\partial_z + \sigma_1\kappa(Z) + V(Z))\epsilon + \Gamma N(\epsilon, \epsilon^*)\epsilon = 0 \quad (13)$$

where Γ=a nondimensional measure of the nonlinear refractive index component, $\epsilon$ is the linear perturbation state and $\epsilon^*$ is its complex conjugate, and $N(\epsilon,\epsilon^*)$ is given by the matrix:

$$N(\varepsilon, \varepsilon^*) = \begin{pmatrix} |E_+|^2 + 2|E_-|^2 & 0 \\ 0 & |E_-|^2 + 2|E_+|^2 \end{pmatrix} \quad (14)$$

Given a linear perturbation mode [$E^o$, $\omega^{(0)}$] that solves equation (11), we can represent the energy $\epsilon$ and frequency ω of the nonlinear perturbation mode equation (13) as:

$$\epsilon(\alpha) = \alpha[E^o(Z) + \text{terms proportional to } |\alpha|^2] \quad (15)$$

$$\omega(\alpha) = \omega^{(0)} + |\alpha|^2 \omega^{(1)} + \text{terms proportional to } |\alpha|^4 \quad (16)$$

The eigenvalue $\omega^{(1)}$, which is a first order correction to $\omega^{(0)}$ that accounts for nonlinearities, is given by equation (17) below:

$$\omega^{(1)} = -\Gamma \int (|E_+^o|^4 + 4|E_+^o|^2|E_-^o|^2 + |E_-^o|^4)dZ / \int (|E_+^o|^2 + |E_-^o|^2)dZ, \quad (17)$$

where each of the integrals in equation (17) ranges from $-\infty$ to $+\infty$. The parameter a measures the "distance" from the linear frequency axis along curve 80 of FIG. 4. Roughly, $|\alpha|^2$ is ~intensity. The negative sign in equation (17) implies that curve 80 must bend to the left. Curve 80 is parameterized by the function:

$$\alpha \to [\omega(\alpha), \int |E(Z; \alpha)|^2 dZ] \quad (18)$$

where the integral in equation (18) ranges from $-\infty$ to $+\infty$.

Figure 4:
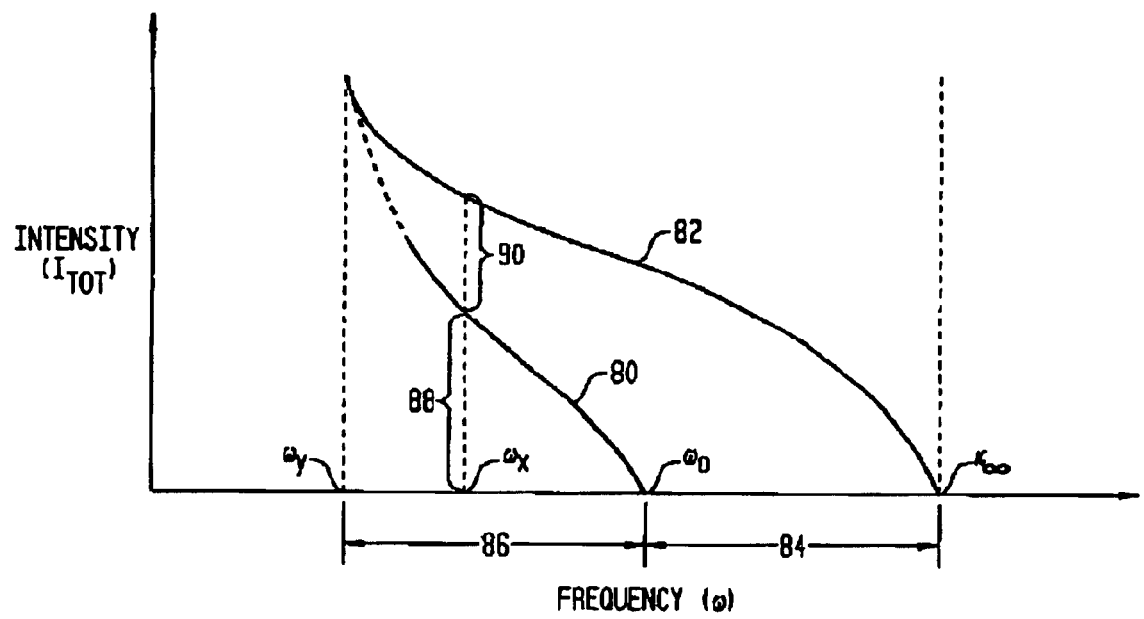
FIG. 4 is a computer simulation of optical total intensity versus frequency for gap solitons (curve 82) and a single nonlinear perturbation mode (curve 80), which is useful in understanding how gap solitons are captured.
Figure 10A:
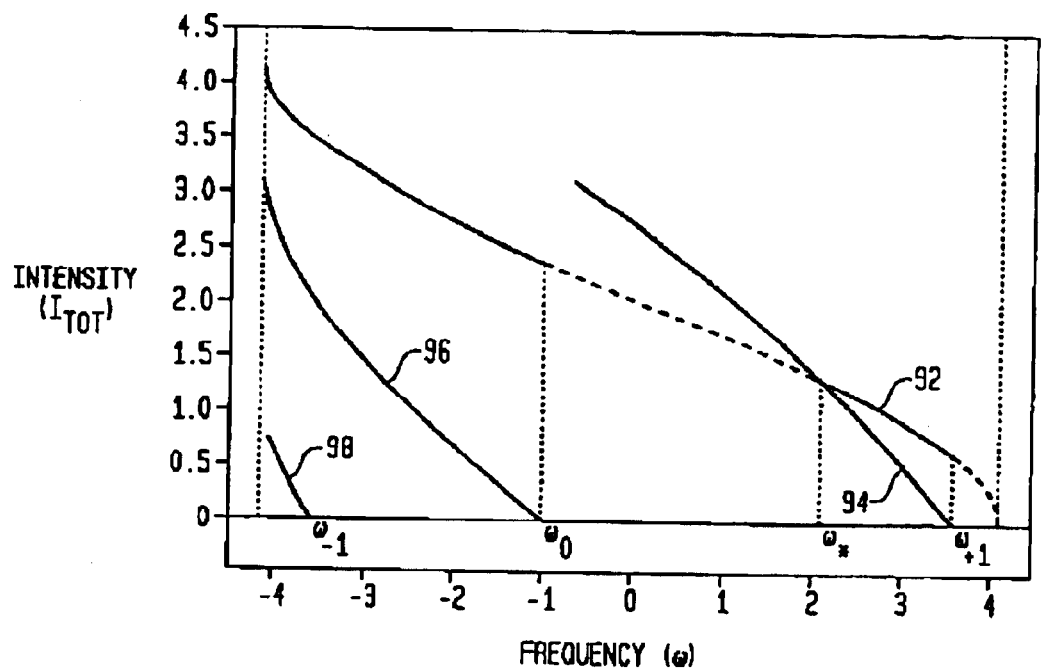
FIG. 10A is a computer simulation of optical total intensity versus frequency for gap solitons (curve 92) and three nonlinear perturbation modes (curves 94, 96, 98), which is useful in understanding how gap solitons are captured.

Equation (17) defines the shape of the intensity vs. frequency characteristic of an illustrative family of nonlinear perturbation modes, which is shown by curve 80 of FIG. 4 and curves 94, 96, 98 of FIG. 10A.

For the spatially homogeneous case, gap solitons are seen to bifurcate (i.e., split the intensity-frequency space of FIG. 4 into two parts) from the zero state ($I_{tot}=0$) at the right endpoint of the continuous spectrum, $\omega=\kappa_\infty$. $I_{tot}$ is given by equation 16, infra. For the given perturbation a branch of nonlinear perturbation modes bifurcates from the zero state at $\omega^{(0)}=\omega_0$. In the frequency range 84 ($\omega_0 < \omega < \kappa_\infty$), where there is no overlap between gap soliton curve 82 and perturbation mode curve 80, there is no correspondence (resonance) between the soliton modes and the perturbation modes. Thus, in this range the gap soliton will not transfer its energy to any perturbation mode. In contrast, in the range 86, where ($\omega < \omega_0$) and the intensity of the perturbation mode is not greater than that of the gap soliton, curves 80 and 82 overlap one another. Consequently, gap solitons in this range are able to transfer all, or some, of their electromagnetic energy to corresponding perturbation modes. For example, at $\omega=\omega_x$ the gap soliton transfers a major portion of its energy (proportional to total intensity 88) to the corresponding perturbation mode, whereas the remaining portion (proportional to total intensity 90) is dissipated (e.g., scattered out of the perturbation region). On the other hand, at $\omega=\omega_y$, at or near to the point where curves 80 and 82 intersect, the gap soliton transfers essentially all of its energy to the corresponding perturbation mode.

In summary, we state here a basic principle that governs soliton-perturbation interactions. If a gap soliton has sufficiently low velocity when it is incident on the perturbation region, the gap soliton will transfer its energy to a perturbation mode, thereby being trapped, provided there exists a nonlinear perturbation mode of the same frequency (resonance) and of lower intensity (energy accessibility). Otherwise, the gap soliton will be transmitted and/or reflected by the perturbation region.

Simulation Examples

Figure 3:
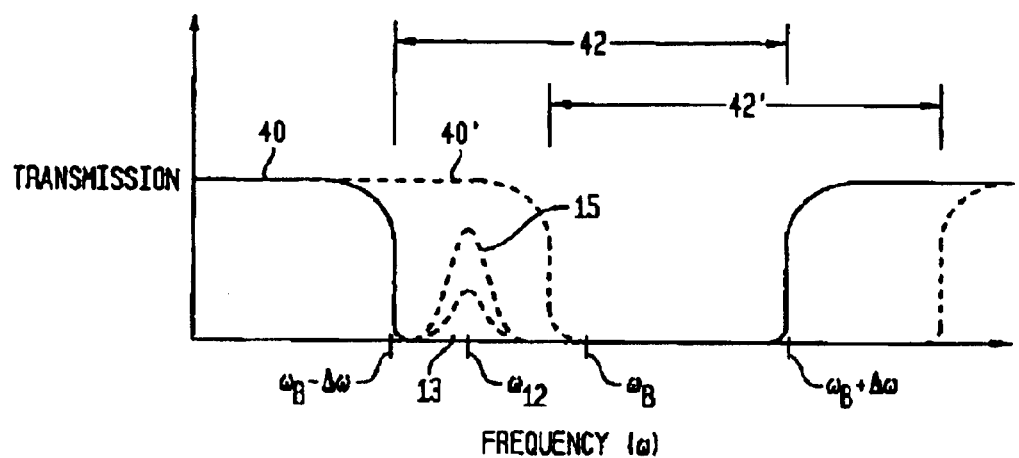
FIG. 3 is a schematic representation of the photonic band gap, which is useful in understanding gap solitons.

We now describe numerical simulation experiments that demonstrate the validity of this principle. The perturbations are members of a 3-parameter ($\omega_0$, k, n) family that derives from a class of perturbations to uniform gratings given by:

$$\kappa(Z) = [\omega^2 + m^2 k^2 \tan h^2 (kZ)]^{0.5} \quad (19)$$

$$V(Z) = [\omega m k^2 \sec h^2(kZ)]/2[\omega^2 + m^2 k^2 \tan h^2(kZ)] \quad (20)$$

and the gap solitons are described by two parameters (v, δ), where v is a dimensionless velocity of the gap soliton, which varies between 0 and 1 and corresponds to real velocities between 0 and $c/n_b$, where $n_b$ is the background refractive index; and cos δ is a detuning parameter, which defines amount of photonic band gap shift that the soliton produces (cf, FIG. 3). In addition, k is a parameter that can assume any real value; and m is any positive integer.

We primarily considered gap solitons that had spatial widths and amplitudes (intensities) comparable to those of the perturbation modes. Thus, we expect the interaction of the incoming pulse with the perturbation mode to be strong since the shapes of the soliton pulse and the perturbation mode are similar to one another. Physical experiments so far have produced solitons with relatively large values of v and relatively small values of δ, so we have illustrated that solitons in this parameter regime can be trapped. Although our experiments were nondimensional, the dimensional equivalents are well known in the art. Soliton intensities ranged from 130 to 1800 GW/cm², their spatial pulse widths were between 1.3 and 4.4 mm (FWHM), and the perturbation spatial widths were between 1.6 and 4.7 mm (FWHM).

In these simulations the frequency of the linear perturbation mode is given by $\omega_J$, whereas $\omega = \kappa_\infty \cos \delta$ is the frequency of a stationary gap soliton; i.e., a gap soliton with $v=0$.

EXAMPLE 1

Example 1a

In this example we consider the simplest of soliton pulses interacting with perturbation gratings defined by equations (19) and (20) for the case of $n=1$, $k=4$ and $\omega_0=-1$. This perturbation region supports a single nonlinear ground state. A gap soliton with frequency $\omega = \kappa_{28} \cos \delta$ will interact most strongly with the perturbation if a nonlinear perturbation mode exists with the same frequency and no greater total intensity, where the latter is given by:

$$I_{tot} = \int (|E_+|^2 + |E|^2) dZ \quad (21)$$

and the integral is taken over the range $-\infty$ to $+\infty$.

As discussed earlier, if such a perturbation mode exists, it is possible for the gap soliton to resonantly transfer its energy to the perturbation mode. Once a gap soliton is traveling sufficiently slowly, the dominant mechanism for capture is resonant energy transfer.

FIG. 4 displays the $I_{tot}$ vs. $\omega$ curves for the nonlinear perturbation modes (curve 80) of this example and that of the stationary (v=0) gap soliton (curve 82). It indicates that resonant energy transfer between gap solitons and the perturbation modes should occur for $\omega < \omega_0 = -1$, in region 84 where curves 80 and 82 overlap, but not for $\omega > \omega_0$, where they do not overlap. Computer simulations indicate the applicability of the v=0, gap soliton curve 82 to gap solitons with sufficiently small velocities. With the present set of perturbation parameters, we investigated the interactions of a 2-parameter family of gap soliton solutions indexed by its nondimensional, normalized velocity v and the detuning parameter δ. As δ varied between 0 and π, the gap soliton curve 82 was traversed from right to left.

Our first experiment was for δ=0.9. The soliton pulse was of comparable amplitude (also known as depth) and width to V and κ, respectively, of the perturbation region, so that on the surface it seemed like a good candidate for capture. However, upon closer inspection we noted that the central frequency of this gap soliton at small velocities was $\kappa_\infty \cos \delta \approx 2.56 > \omega_o = -1$, so this perturbation mode would not resonate with the gap soliton.

Indeed, although we observed a slowing, and therefore a delay, of the gap soliton, we did not find significant excitation of the perturbation mode or trapping. We found that below a critical velocity v≈0.257, all gap solitons were reflected, and above this critical velocity they were transmitted. The closer the incoming soliton pulse came to this critical velocity, the longer it remained in the neighborhood of the perturbation region before being ejected. After being ejected, the velocity of the outgoing soliton pulse was approximately equal to that of the incoming pulse. FIGS. 2A and 2B show the evolution of two gap solitons incident on this perturbation. Both were very close to the critical velocity. The soliton 12 in FIG. 2A was reflected by the perturbation region at z=0, as depicted by the soliton $12_r$; that in FIG. 2B was transmitted as depicted by the soliton $12_t$.

The reflection, as well as the transmission, of these gap solitons is well-explained by FIG. 4.

Example 1b

FIG. 4 also suggests that gap solitons with larger values of detuning δ (and hence higher total intensities $I_{tot}$) may interact more strongly with the perturbation region; as curves 80 and 82 get closer together at higher intensities (i.e., at frequencies approaching $\omega_y$), the portion of scattered/reflected energy 90 decreases, whereas the portion of trapped energy 88 increases. We, therefore, ran the experiment again with δ=2 ($\omega$=−1.72) below $\omega_0$ and v=0.2. The results are shown in FIG. 2C. When the soliton 12 encountered the perturbation region at z=0, it split into three parts: a transmitted soliton $12_t$, a trapped/captured mode $12_c$, and radiation (not shown). The mode that remained trapped at the perturbation region had only about 16% of the total intensity of the incoming gap soliton. Remarkably, at the end of the computation the captured state's frequency was approximately $\omega$=−1.7 and the total intensity of the trapped part of the incident pulse was such that the trapped energy was described by a point very close to the nonlinear-bound-state-curve 80 of FIG. 4. This result supports the first part of our soliton-perturbation interaction principle. For small values of v, the amplitude and frequency of the trapped state do not seem to depend on v. Above a certain larger velocity, significantly less energy is trapped by the defect, suggesting that the interaction principle needs refinement for large velocities. That refinement is discussed below.

The above computations show that a perturbation region can trap a significant portion of the electromagnetic energy in a gap soliton.

Example 1c

To this end, note that the nonlinear perturbation modes of curve 80, FIG. 4 always bifurcate to the left from the linear defect mode frequency for increasing intensity. We again considered the perturbation defined by equations (19) and (20) with n=1, k=4, but now let $\omega_0=1$, which left κ(Z) unchanged, while changing the sign of V(Z). These changes moved the base of the nonlinear bound state curve 80 from $\omega_0=-1$ to $\omega_0=+1$, so that the intensity-frequency curves 80 and 82 moved significantly closer together.

We then examined the interaction of δ=π/2 ($\omega$=0) gap solitons with each of these perturbation regions, the bifurcation diagrams demonstrate that the $\omega_0=1$ perturbation captured a lot of energy from the soliton, whereas the $\omega_0=-1$ perturbation reflected or transmitted the soliton, depending on whether its incoming velocity was small or large. Note, $\omega$ corresponds to the detuning from the Bragg resonant frequency. Therefore, as explained earlier, $\omega$=0 corresponds to a frequency which is at Bragg resonance.

Example 1d

Trapping can be further improved using the family of perturbations defined by equations (19) and (20) with n=1, by increasing the ratio of $\omega_0/\kappa_{28}$. The photonic band gap edge is at $\kappa_\infty = (\omega_0^2 + k^2)^{0.5}$, whereas the perturbation mode curve starts at $\omega_0$ and goes left with increasing intensity. This approach may not be preferred for all applications, however, because as $\omega_0 \to \kappa_\infty$, the width of the photonic band gap increases without bound, while its depth goes to zero.

EXAMPLE 2

Example 2a

In this example we show how to use the generalized perturbation regions of equations (19) and (20) to more efficiently capture gap solitons. We can use these equations to fix the photonic band gap and study the interaction of gap solitons with perturbations of different spatial widths. More specifically, in this example we investigate gap solitons that are incident on a perturbation grating of the form of equations (19) and (20) with $(\omega_0, k, n)=(-1, 2, 2)$. This perturbation is twice the spatial width of the perturbation grating of Example 1, but has the same limiting behavior far from the perturbation region. It can be shown that the perturbation region supports three linear bound states, with ground frequency $\omega_0=-1$ and excited states $\omega_{\pm 1}=\pm\sqrt{13}=3.6$. Branches of nonlinear perturbation modes bifurcate from each of these linear modes, as shown in FIG. 10A, which is the analog of FIG. 4 for this perturbation design. To the left of the indicated frequency $\omega^*$, the $\omega_{+1}$ nonlinear perturbation mode has greater total intensity than the gap soliton. The frequencies $\omega_{-1}, \omega_0, \omega^*$ and $\omega_{+1}$ divide the band gap into 5 regions. In the regions $-\kappa_\infty<\omega<\omega_0$ and $\omega^*<\omega<\omega_{+1}$, we found trapping of soliton energy by the same mechanism as Example 1b, whereas in the regions $\omega_0<\omega<\omega^*$ and $\omega_{+1}<\omega<\kappa_\infty$ we did not find such trapping. In the segment $-\kappa_\infty<\omega<\omega_{-1}$ the behavior was more complex because two trapped nonlinear modes exist. We found the most efficient capture for solitons with frequency slightly greater than $\omega^*$ for which a nonlinear bound state exists of slightly lower intensity than the incoming soliton.

Figure 10B:
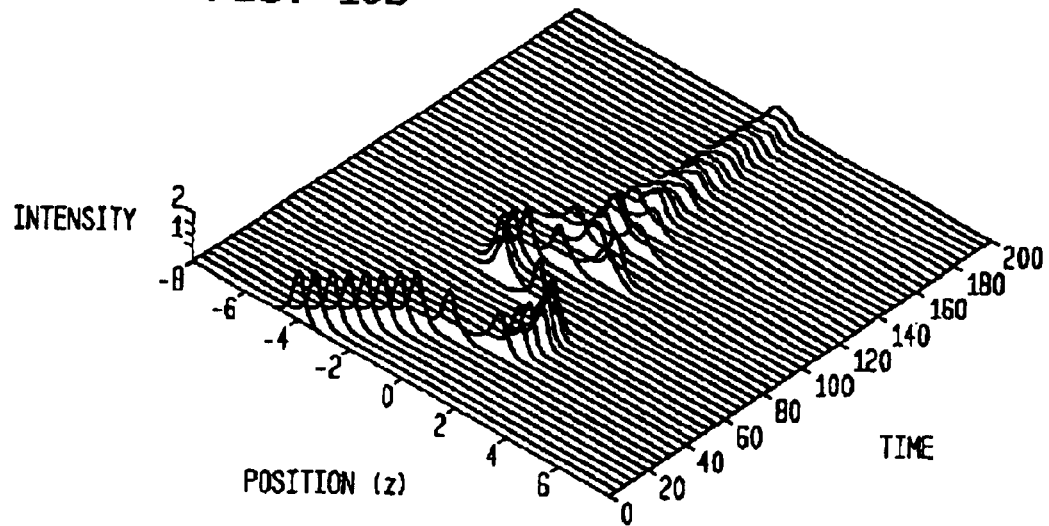
FIG. 10B shows a computer simulation of the evolution of a gap soliton that is trapped by a perturbation region of the type described in conjunction with FIG. 1A.

We first examined gap solitons in the trapping region $\omega^*<\omega<\omega_{+1}$. These solitons had $\delta=0.9$ ($\omega\approx 2.6$), which lie just to the right of $\omega^*$ in FIG. 10A. We found trapping here to be relatively efficient because a soliton can transfer almost all of its energy to the nonlinear perturbation mode of the same frequency and slightly lower intensity. We found trapping for gap solitons slower than a critical velocity of about $v_c=0.102$. In FIG. 10B we show the evolution of a gap soliton, which initially propagates to the right but eventually gets trapped after about $t=100$. The gap soliton was observed to speed up upon reaching the perturbation region, consistent with the perturbation region acting as a potential well. The output velocity vs. soliton input velocity (graph not shown) indicates a sharp transition at $v_c$ from solitons that are trapped to those which are transmitted through the perturbation.

Example 2b

Next we repeated the above experiment but for a smaller value of $\delta=0.6$, which caused the distance between soliton curve 92 and the nearby perturbation mode curve 94 to increase. Consequently, some of the soliton energy was deposited into a perturbation mode, whereas the remaining energy was transmitted through the perturbation region as a diminished gap soliton plus a small amount of radiation.

Gap solitons with frequency $\omega<\omega_0$ were trapped in a manner similar those in Example 1b. When $\omega<\omega_{-1}$, all three nonlinear perturbation modes are excited by the gap soliton. More unexpectedly, in the region $\omega_0<\omega<\omega^*$ the gap soliton, while never captured, was never reflected either. In this frequency range, for every initial velocity as low as $v=0.0006$, the soliton was transmitted after slowing down slightly when encountering the perturbation region.

EXAMPLE 3

Example 3a

By widening the perturbation region, more eigenvalues were placed closer to the edges of the band gap. These additional eigenvalues were used to trap gap solitons with even smaller values of $\delta$. For example, a perturbation region of the type defined by equations (19) and (20), with parameters $(\omega_0, k, n)=(-1, 1.6, 2.5)$ and $\kappa_\infty=\sqrt{17}=4.1$, has 5 eigenvalues: $\omega_0=-1$, $\omega_{\pm 1}=\pm(281)^{0.5}/5$, and $\omega_{\pm 2}=\pm(409)^{0.5}/5$. We demonstrated that this perturbation region captured a gap soliton with $\delta=0.45$ even though its velocity was significantly reduced to about $v=0.025$. In contrast, we found that the perturbation region of Example 2 (the case where $k=n=2$) reflected this soliton, as its central frequency was to the right of the perturbation mode curve in FIG. 10A.

Example 3b

We explored even wider perturbation widths by choosing parameters $k=4/3$, $n=3$ in equation (19). However, compared to the example given in the preceding paragraph: (i) the gap soliton parameters were the same; (ii) the perturbation was slightly wider but still supported five linear bound states; and (iii) the eigenvalues were slightly smaller with $\omega_0=-1$, $\omega_{\pm 1}=\pm(89)^{0.5}/3$, and $\omega_{\pm 2}=\pm(137)^{0.5}/3$. In this case, trapping was significantly less effective. A much smaller (i.e., lower intensity) bound state was trapped. As with the first portion of Example 3, most of the energy was localized in the modes belonging to $\omega_{+1}$ and $\omega_{+2}$, although the $\omega_{+1}$ mode began growing sooner.

EXAMPLE 4

Gap solitons that are not trapped by a perturbation region may be severely slowed. Consequently, a multiplicity of perturbation regions of the type described above were used to first slow down and then trap a gap soliton, as described earlier in conjunction with FIG. 5. Using a pair of tandem perturbation regions, such as regions 30 and 22 of FIG. 5, we have demonstrated that region 22 can trap a gap soliton whose initial velocity was 50% higher than the critical velocity found in Example 1. We designed the perturbation region 22 using equations (19) and (20) of Example 2 for $\kappa_{22}(Z)$ and $V_{22}(Z)$ and then the perturbation region 30 by letting $$\kappa_{30}(Z)=\kappa(Z-Z_1)+\kappa(Z-Z_2)-\kappa_\infty \qquad (22)$$

and $$V_{30}(Z)=V(Z-Z_1)+V(Z-Z_2) \qquad (23)$$

We utilized in our simulations two tandem perturbation gratings with $Z=-3$ and $Z=3$. The first grating 30 slowed the gap soliton, which had $\delta=0.9$ and $v=0.15$, and the second perturbation region 22 trapped the slowed soliton.

EXAMPLE 5

In this example we demonstrated that a gap soliton can be trapped between two perturbations, such as perturbations 30 and 32 of FIG. 5, neither of which by itself is able to trap the soliton. In Example 1 solitons with frequencies to the right of the ground state frequency were slowed but not trapped upon encountering the perturbation region (e.g., downstream region 32 of FIG. 5). We modified the design by adding a second perturbation region (e.g., upstream region 30 of FIG. 5) that functions as a potential barrier. This configuration of tandem perturbation regions trapped a gap soliton in a novel way. Instead of a bound state forming near the minimum of $\kappa(Z)$, the gap soliton bounced back and forth between the two perturbation regions. Furthermore, this configuration captured the soliton with an incident velocity of $v=0.3$, about 3 times the critical velocity for the generalized perturbation grating described in Example 2. In addition, the rate of energy loss for gap solitons captured by this perturbation configuration was significantly reduced. We demonstrated that solitons with δ=0.9 and as fast as v=0.2625 and v=0.3 can be captured, but as the velocity increases, the efficiency of capture decreases.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the capture of solitons with relatively large values of δ implies that the optical structure must be capable of withstanding the optical intensity associated with the particular δ. Alternatively, for given values of δ and v the optical intensity is inversely proportional to the nonlinear refractive index $n_2$. Therefore, the optical structure could be made of a material with a higher value of $n_2$. For example, $n_2$ is about 500 times larger in chalcogenide glass optical fibers than in silica fibers. However, in chalcogenide fibers the imaginary part of $n_2$ is also significantly larger, corresponding to nonlinear damping arising from multi-photon absorption. Therefore, the chalcogenide glass composition should be chosen to reduce both two-photon and three-photon absorption. By so designing the optical structure one can achieve $n_2$ nearly 500 times that of silica while suffering a multi-photon loss of only a few percent at intensities for a nonlinear phase shift of π.

In addition, a complex cubic refractive index gives rise to a complex coefficient $\Gamma=\Gamma_r+i\Gamma_i$, where $\Gamma_r$ and $\Gamma_i$, respectively, denote the real and imaginary parts of the nonlinear coefficient. ($\Gamma_1$ non-zero and positive implies nonlinear absorption.). What is important, however, is the ratio $\Gamma_i/\Gamma_r$. In this case we are more interested in simply simulating the propagation of optical pulses that at t=0 correspond to gap solitons. The strength of the damping is proportional to the maximum optical intensity, or $\sin^2(\delta/2)$. Therefore, as we decrease δ, the effect of the nonlinear damping should be decreased. However, decreasing δ requires a decrease in the gap soliton velocity for trapping, so that pulses will have more time to decay as they propagate before reaching a perturbation region. In one set of simulations we used the following: damping ratios $\Gamma_i/\Gamma_r=0.1, 0.01$ and 0.001, gap soliton parameters v=0.23 and δ=0.9, and perturbation region parameters $\omega_0=-1$, k=2 and n=2 [in equations (19) and (20)]. Without nonlinear damping, we found that the perturbation region would not capture these solitons. With damping ratio 0.1, the gap soliton was effectively damped before it even reached the perturbation region. With damping ratio 0.01, the soliton lost just enough energy that much of it was captured upon reaching the perturbation region. And, with damping ratio 0.001, the soliton propagated through the perturbation region untrapped.

We claim:

1. Apparatus for controlling gap solitons comprising:
   an optical structure that includes a first region in which the refractive index varies essentially periodically, characterized in that
   said structure supports the propagation of gap solitons therein, and
   said structure includes a perturbation region within said first region, said perturbation region having nonlinear perturbation modes, the amplitude, phase and/or average value of the refractive index of said perturbation region being mutually adapted so that a gap soliton transfers its energy to at least one of said perturbation modes.

2. The apparatus of claim 1, wherein said structure supports the propagation of gap solitons at a speed less than a critical speed for capture of the soliton by the perturbation region.

3. The apparatus of claim 1, wherein said perturbation region has a nonlinear perturbation mode of essentially the same frequency as said soliton.

4. The apparatus of claim 1, wherein said perturbation region has a nonlinear perturbation mode of lower intensity than said soliton.

5. The apparatus of claim 1, wherein the width of said perturbation region is of the same order as the spatial width of said soliton.

6. The apparatus of claim 1, wherein said structure supports the propagation of gap solitons at a speed greater than a critical speed for capture of the soliton by said perturbation region, and said structure includes a second perturbation region within said first region that reduces the speed of said soliton to less than said critical speed.

7. The apparatus of claim 1, wherein the amplitude, phase and/or average value of the refractive index of said perturbation region are mutually adapted so that a gap soliton transfers essentially all its energy to at least one of said perturbation modes, thereby being trapped by said perturbation region.

8. The apparatus of claim 1, wherein said optical structure comprises an optical waveguide that supports the propagation of said solitons.

9. The apparatus of claim 7, further including means for altering the refractive index of said perturbation region, thereby to cause said trapped soliton to escape.

10. A memory comprising:
    a source of gap solitons,
    a soliton trap comprising apparatus according to claim 9,
    an amplifier for increasing the intensity of selected solitons,
    a controller for controlling (i) said amplifier so that it increases the intensity of only said selected solitons and (ii) said altering means for determining when a trapped soliton escapes,
    a utilization device for receiving said solitons that escape from said trap, and
    periodic optical waveguides coupling said source, trap, amplifier and utilization device to one another.

11. WDM apparatus comprising
    a source of gap solitons of at least two different optical frequencies,
    an input periodic optical waveguide for receiving said solitons for propagation therein,
    a multiplicity of output periodic optical waveguides, and
    a WDM demultiplexer coupling said input waveguide to each of said output waveguides,
    each of said output waveguides including apparatus according to claim 9, and each of said apparatus being designed to trap a soliton of a different frequency.

12. Apparatus for controlling gap solitons comprising:
    an optical waveguide that includes a first region in which the refractive index varies essentially periodically, characterized in that
    said waveguide supports the propagation of gap solitons therein, and
    said waveguide includes a perturbation region within said first region, said perturbation region having nonlinear perturbation modes, the amplitude, phase and/or average value of the refractive index of said perturbation region being mutually adapted so that a gap soliton transfers essentially all of its energy to at least one of said perturbation modes, said waveguide supports the propagation of gap solitons at a speed less than a critical speed for capture of the soliton by said perturbation region, said perturbation region has a nonlinear perturbation mode of essentially the same frequency as said soliton, said perturbation region has a nonlinear perturbation mode of lower intensity than said soliton, and the width of said perturbation region is of the same order as the spatial width of said soliton.

* * * * *